United States Patent
Guo et al.

(10) Patent No.: US 12,007,760 B2
(45) Date of Patent: Jun. 11, 2024

(54) ANOMALY DETECTION AND DIAGNOSIS IN FACTORY AUTOMATION SYSTEM USING PRE-PROCESSED TIME-DELAY NEURAL NETWORK WITH LOSS FUNCTION ADAPTATION

(71) Applicant: Mitsubishi Electric Research Laboratories, Inc., Cambridge, MA (US)

(72) Inventors: Jianlin Guo, Newton, MA (US); Bryan Liu, Sydney (AU); Toshiaki Koike Akino, Belmont, MA (US); Ye Wang, Andover, MA (US); Kyeong Jin Kim, Lexington, MA (US); Kieran Parsons, Gloucester, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 153 days.

(21) Appl. No.: 17/464,901

(22) Filed: Sep. 2, 2021

(65) Prior Publication Data
US 2023/0068908 A1 Mar. 2, 2023

(51) Int. Cl.
*G05B 23/02* (2006.01)
*G05B 19/418* (2006.01)
(Continued)

(52) U.S. Cl.
CPC ..... *G05B 23/0283* (2013.01); *G05B 19/4184* (2013.01); *G06F 18/2148* (2023.01); *G06N 3/049* (2013.01); *G05B 23/0221* (2013.01)

(58) Field of Classification Search
USPC ......................................................... 702/184
See application file for complete search history.

(56) References Cited

U.S. PATENT DOCUMENTS

| 2004/0078171 A1* | 4/2004 | Wegerich | G05B 23/0281 |
| | | | 702/188 |
| 2019/0188584 A1* | 6/2019 | Rao | G06Q 10/00 |

(Continued)

*Primary Examiner* — Paul D Lee
(74) *Attorney, Agent, or Firm* — Gene Vinokur; Hironori Tsukamoto (57) ABSTRACT

A computer-implemented pre-processed time-delay autoencoder based anomaly detection method are provided for detecting anomalous states of machines arranged in a factory automation (FA) system or a manufacturing production line. The method includes acquiring source signals from the machines via an interface performing a data pre-processing process for the acquired source signals by normalizing value ranges of the acquired source signals and filtering undesired features from the acquired source signals performing a time-delayed data reform process for the pre-processed source signals based on a time-delay window to generate pre-processed time-delay data submitting pre-processed time-delay testing data to a pre-processed time-delayed autoencoder (Prep-TDAE) neural network, wherein the pre-processed time-delay testing data are collected online while the machines are operated, wherein the Prep-TDAE neural network has been pre-trained by using the pre-processed time-delay training data detecting, if an anomaly state is encountered with respect to the machines, by computing anomaly scores of the pre-processed time-delay testing data, and determining, when the anomaly state is detected, anomaly occurrence time, duration and severity with respect to the anomaly state of each of the machines.

12 Claims, 8 Drawing Sheets

(51) Int. Cl.
*G06F 18/214* (2023.01)
*G06N 3/049* (2023.01)

(56) References Cited

U.S. PATENT DOCUMENTS

| | | | | |
|---|---|---|---|---|
| 2019/0302707 A1* | 10/2019 | Guo | ...................... | G06N 3/082 |
| 2020/0379454 A1* | 12/2020 | Trinh | ................... | G05B 23/024 |
| 2022/0128983 A1* | 4/2022 | Zhang | ................... | G06F 18/251 |

* cited by examiner

ANOMALY DETECTION AND DIAGNOSIS IN FACTORY AUTOMATION SYSTEM USING PRE-PROCESSED TIME-DELAY NEURAL NETWORK WITH LOSS FUNCTION ADAPTATION

FIELD OF THE INVENTION

This invention relates generally to the anomaly detection and diagnosis using machine learning techniques, and particularly to anomaly detection and diagnosis using pre-processed time-delay neural network with loss function adaptation.

BACKGROUND OF THE INVENTION

The downtime in a factory automation (FA) system describes the period of time that system stops its production. A machine or an equipment in FA system might stop working due to the anomaly, fault or intrusion. Therefore, it is essential to accurately detect the anomaly in FA systems. Once an anomaly is detected in the system, the causes of the anomaly needs to be identified to quickly restore FA system into normal condition. Anomaly diagnosis is to find exact sources that have caused anomaly. Therefore, anomaly diagnosis is also critical in FA system. As a result, both anomaly detection and anomaly diagnosis are required to improve the production efficiency in FA systems.

Machine learning techniques have been applied for anomaly detection in manufacturing systems. Machine learning techniques consists of supervised learning and unsupervised learning. Supervised learning is not suitable for FA systems due to data complexity and difficulty of labeling data in FA system. Therefore, unsupervised learning techniques are typically used for anomaly detection in FA systems.

Traditional machine learning algorithms for anomaly detection such as isolation forest (IF), one-class support vector machine (OC-SVM) and local outlier factor (LOF) have relatively low computational complexity and are capable to detect anomalies when the data does not have complex structures, which is not the case for factory automation system, where various data structures present.

Modern machine learning techniques, in particular, the autoencoder neural network has been shown applicable for anomaly detection in both process manufacturing and discrete manufacturing. Inherit from vast neural network designs, autoencoder is able to learn complex structures of the data and achieve relatively better anomaly detection performance compared with other types of learning techniques. However, FA system requires accurate anomaly detection. Due to complexity of FA data, conventional autoencoder still cannot satisfy the requirements of FA systems.

To improve FA system production efficiency, autoencoder must address following issues: 1) loss function (objective function) adaptation, 2) temporal information discover and 3) data cleaning; i.e., data preprocess. Conventionally, only one loss function is used in machine learning neural networks such as autoencoder. This approach works for applications with single type of data such as image processing. On the other hand, a FA system has various data types, a loss function that works for one type of data may not work well for other types of data. As a result, different loss functions should be used for different types of data. Therefore, loss function adaptation is required. In FA systems, exploring historic data may reveal critical information in anomaly detection and diagnosis. For example, an anomaly may be caused by a series of miss-operations. To identify such anomaly, the corresponding data samples are needed. The noise in raw data may lead autoencoder to make false alarms or miss real anomaly. As a result, how to build such complex autoencoder neural network becomes an issue to be addressed.

Even anomaly diagnosis is critical in FA systems, there is not much work on anomaly diagnosis in FA systems. When anomalies are detected in a FA system, what are the sources or causes of the anomalies. Anomaly diagnosis refers to the tasks of identifying the exact sources that have caused the anomaly. In FA system, a source can be a machine, a hardware part or a software program. To avoid downtime, exact sources must be identified to quickly restore system to normal condition.

To improve FA system performance, both anomaly detection and anomaly diagnosis mechanisms are needed. Due to data complexity in FA systems, machine learning techniques require loss function adaptation. In addition, to improve anomaly detection and diagnosis accuracy, temporal information must be considered. Furthermore, both anomaly detection and diagnosis techniques rely on the accuracy of training of the training data. Source data (raw data) may contain noise and might be difficult to learn data characteristics. Therefore, it becomes desirable for machine learning techniques to adaptively select loss functions, explore temporal data relationship and pre-process source data to achieve high performance of anomaly detection and diagnosis in FA systems.

SUMMARY OF THE INVENTION

Some embodiments of the invention are based on the recognition that supervised learning is not suitable for FA system anomaly detection due to the data complexity and difficulty of labeling data or classifying data.

Accordingly, some embodiments of the invention provide autoencoder based unsupervised anomaly detection in FA systems through unsupervised learning using unlabeled training data.

Some embodiments of the invention are based on the recognition that a FA system contains multiple types of data such as analog data and binary data, the different types of data have different features and different requirements on loss function and need to be trained with different loss functions. Furthermore, data in a FA system can be correlated and therefore, all types of data must be trained together. As a result, loss function adaptation is a key to achieve accurate anomaly detection performance.

Accordingly, some embodiments of the invention adaptively select loss function in training process. The selection of loss function depends on data types.

Some embodiments of the invention are based on the recognition that data history can provide important information for FA system anomaly detection, e.g., some anomaly may be caused by a series of miss-operations. Therefore, taking into account of temporal factor can detect anomaly that is caused by a series of miss-operations.

Accordingly, some embodiments of the invention provide that the pre-processed data can be used on top of a time-delay autoencoder neural network, which explores the temporal information of the data signals. The time-delayed reform of the data signals can be directly applied to the pre-processed data signals.

Some embodiments of the invention are based on the recognition that FA system data contain various noises, e.g., some machinery can emit powerful radio noise, which can have severe impact on data quality and anomaly detection accuracy. Therefore, data cleaning, especially training data cleaning for reducing the various noises, is critical to improve the anomaly detection accuracy.

Accordingly, some embodiments of the invention pre-processes raw data by applying data filters to clean data before feeding raw data to neural network.

Further, some embodiments of the present invention are based on recognition that a computer-implemented pre-processed time-delay autoencoder based anomaly detection method can be provided for detecting anomalous states of machines arranged in a factory automation (FA) system or a manufacturing production line. The computer-implemented pre-processed time-delay autoencoder based anomaly detection method may include steps of: acquiring source signals from the machines via an interface; performing a data pre-processing process for the acquired source signals by normalizing value ranges of the acquired source signals and filtering undesired features from the acquired source signals; performing a time-delayed data reform process for the pre-processed source signals based on a time-delay window to generate pre-processed time-delay data; submitting pre-processed time-delay testing data to a pre-processed time-delayed autoencoder (Prep-TDAE) neural network, wherein the pre-processed time-delay testing data are collected online while the machines are operated, wherein the Prep-TDAE neural network has been pre-trained by using the pre-processed time-delay training data; detecting, if an anomaly state is encountered with respect to the machines, by computing anomaly scores of the pre-processed time-delay testing data; and determining, when the anomaly state is detected, anomaly occurrence time, duration and severity with respect to the anomaly state of each of the machines.

Further, a pre-processed time-delay autoencoder based anomaly detection system is provided for detecting anomalous states of machines arranged in a factory automation (FA) system or a manufacturing production line. The system may include an interface configured to acquire source signals from the machines; a memory to store computer-executable programs including a data pre-processing algorithm, a time-delayed data reform process algorithm, a pre-processed time-delay autoencoder (Pre-TDAE) neural network, an anomaly diagnosis algorithm and the computer-implemented statistical-based anomaly diagnosis method; and a processor configured to perform steps of: performing the data pre-processing process algorithm for the acquired source signals by normalizing value ranges of the acquired source signals and filtering undesired features from the acquired source signals; performing the time-delayed data reform process algorithm for the pre-processed source signals based on a time-delay window to generate pre-processed time-delay data; submitting pre-processed time-delay testing data to the Prep-TDAE neural network, wherein the pre-processed time-delay testing data are collected online while the machines are operated, wherein the Prep-TDAE neural network has been pre-trained by using the pre-processed time-delay training data; detecting, if an anomaly state is encountered with respect to the machines, by computing anomaly scores of the pre-processed time-delay testing data; and determining, when the anomaly state is detected, anomaly occurrence time, duration and severity with respect to the anomaly state of each of the machines.

Some embodiments of the invention are based on the recognition that once anomaly is detected in FA systems, anomaly diagnosis is required to identify the exact sources that have caused the anomaly and therefore, quickly restore system into normal condition.

Yet further, a computer-implemented statistical-based anomaly diagnosis method can be provided for diagnosing anomaly sources of machines arranged in a factory automation (FA) system or a manufacturing production line. The method may include steps of: acquiring source signals from the machines via an interface; performing a data pre-processing process for the acquired source signals based on a data pre-processing process algorithm; performing a time-delayed data reform process algorithm for the acquired source signals based on a time-delay window to generate pre-processed time-delay data; normalizing the pre-processed time-delay data so as to have zero mean and unit variance; computing a statistical shrunk covariance matrix to avoid the covariance matrix to be noninvertible; computing a whitening matrix for whitening transform; performing the whitening transform of the signals for the mean and the variance computation; computing the mean and the variance of the transformed signal for an anomaly score computation; computing an anomaly score for each data signal for anomalous data signal diagnosis; diagnosing the anomalous data signals; and identifying a machine with the anomaly among the machines using the anomaly diagnosis algorithm.

Further, some embodiments can provide a statistical-based anomaly diagnosis system for diagnosing anomaly sources of machines arranged in a factory automation (FA) system or a manufacturing production line. The statistical-based anomaly diagnosis system may include an interface configured to acquire source signals from the machines; a memory to store computer-executable programs including a data pre-processing algorithm, a time-delayed data reform process algorithm, an anomaly diagnosis algorithm and the computer-implemented statistical-based anomaly diagnosis method; and a processor configured to execute the computer-executable programs, wherein the processor performs steps of: performing the data pre-processing process algorithm for the acquired source signals; performing the time-delayed data reform process algorithm for the acquired source signals based on a time-delay window to generate pre-processed time-delay data; normalizing the pre-processed time-delay data so as to have zero mean and unit variance; computing a statistical shrunk covariance matrix to avoid the covariance matrix to be noninvertible; computing s whitening matrix for whitening transform; performing the whitening transform of the signals for the mean and the variance computation; computing the mean and the variance of the transformed signal for an anomaly score computation; computing an anomaly score for each data signal for anomalous data signal diagnosis; diagnosing the anomalous data signals; and identifying a machine with the anomaly among the machines using the anomaly diagnosis algorithm.

According to some embodiments of the present invention, a computer-implemented residual error-based anomaly diagnosis method can be provided for diagnosing anomaly sources of machines arranged in a factory automation (FA) system or a manufacturing production line. The computer-implemented residual-based anomaly diagnosis method may include steps of acquiring source signals from the machines via an interface; performing a data pre-processing process algorithm for the acquired source signals; performing a time-delayed data reform process algorithm for the acquired source signals based on a time-delay window to generate pre-processed time-delay data; submitting the pre-processed time-delay data to a pre-processed time-delay autoencoder (Pre-TDAE) neural network to generate reconstructed signals, wherein the Prep-TDAE neural network has been pre-trained by training data; computing a residual error based on the reconstructed signals; computing mean and variance of the residual error; computing anomaly scores for the reconstructed signals; diagnosing anomalous signals corresponding to the source signals of the machines based on the anomaly scores; and identifying a machine with an anomaly among the machines using an anomaly diagnosis algorithm.

Further, a residual error-based anomaly diagnosis system is provided for diagnosing anomaly sources of machines arranged in a factory automation (FA) system or a manufacturing production line. The residual-based anomaly diagnosis may include an interface configured to acquire source signals from the machines; a memory to store computer-executable programs including a data pre-processing process algorithm, a time-delayed data reform process algorithm, a pre-processed time-delay autoencoder (Pre-TDAE) neural network, an anomaly diagnosis algorithm and the computer-implemented residual-based anomaly diagnosis method; a processor configured to execute the computer-executable programs, wherein the processor is configured to perform steps of: performing the data pre-processing process algorithm for the acquired source signals; performing the time-delayed data reform process algorithm for the acquired source signals based on a time-delay window to generate pre-processed time-delay data; submitting the pre-processed time-delay data to the Pre-TDAE neural network to generate reconstructed signals, wherein the Prep-TDAE neural network has been pre-trained by training data; computing a residual error based on the reconstructed signals; computing mean and variance of the residual error; computing anomaly scores for each data signal; diagnosing the anomalous signals corresponding to the source signals of the machines based on the anomaly scores; and identifying a machine with an anomaly among the machines using the anomaly diagnosis algorithm.

Accordingly, some embodiments of the invention provide that the residual errors of an autoencoder neural network can indicate the anomaly score of each individual data signal and performing the pre-processing and time-delayed reform can improve the anomaly diagnosis accuracy.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Figure 1:
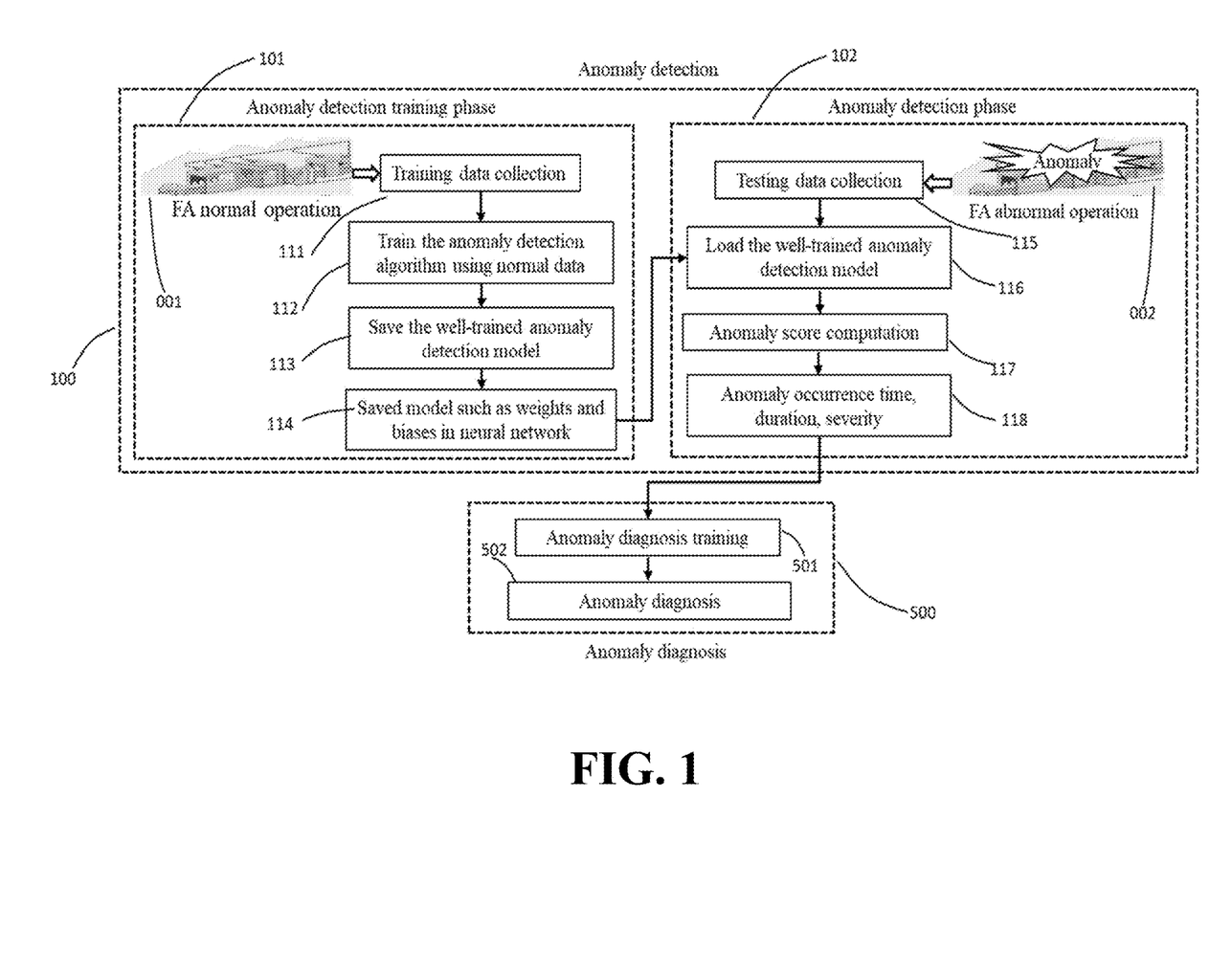
FIG. 1 depicts flowchart of anomaly detection and anomaly diagnosis in factory automation systems, according to embodiments of the present invention.

Anomaly detection and anomaly diagnosis are two different processes that are critical for FA systems to avoid downtime and improve FA system efficiency. Anomaly detection is to determine if a FA system operates with any anomaly or fault. If yes, what are the number of anomalies, what are the times that anomalies occurred, and how long did anomalies last. Once any anomaly has been detected, the anomaly needs to be quickly resolved so that FA system can be restored in normal condition. A FA system can be very complex system. To resolve an anomaly, the causes of the anomaly must be known. Anomaly diagnosis is a process to identify the exact sources that have caused the anomaly. FIG. 1 shows a schematic diagram illustrates the factory system anomaly detection and diagnosis flowchart according to some embodiments of the present invention. There is an anomaly detection block 100 and an anomaly diagnosis block 500. The anomaly detection block 100 consists of anomaly detection training block 101 and anomaly detection block 102. Similarly, the anomaly diagnosis block 500 consists of anomaly diagnosis training block 501 and anomaly diagnosis block 502.

Figure 5:
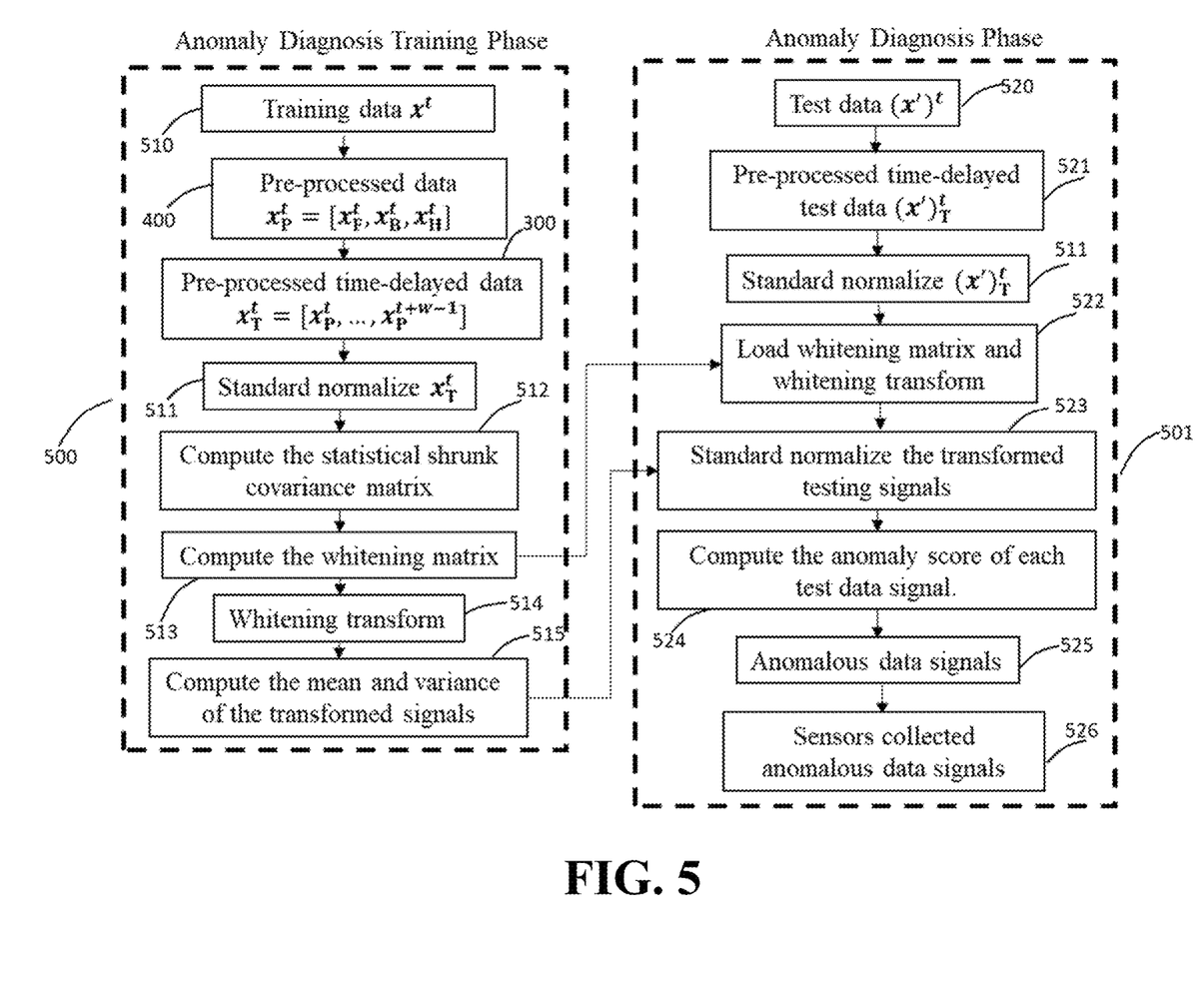
FIG. 5 depicts the flowchart of the statistical based anomaly diagnosis method, according to embodiments of the present invention.
Figure 6:
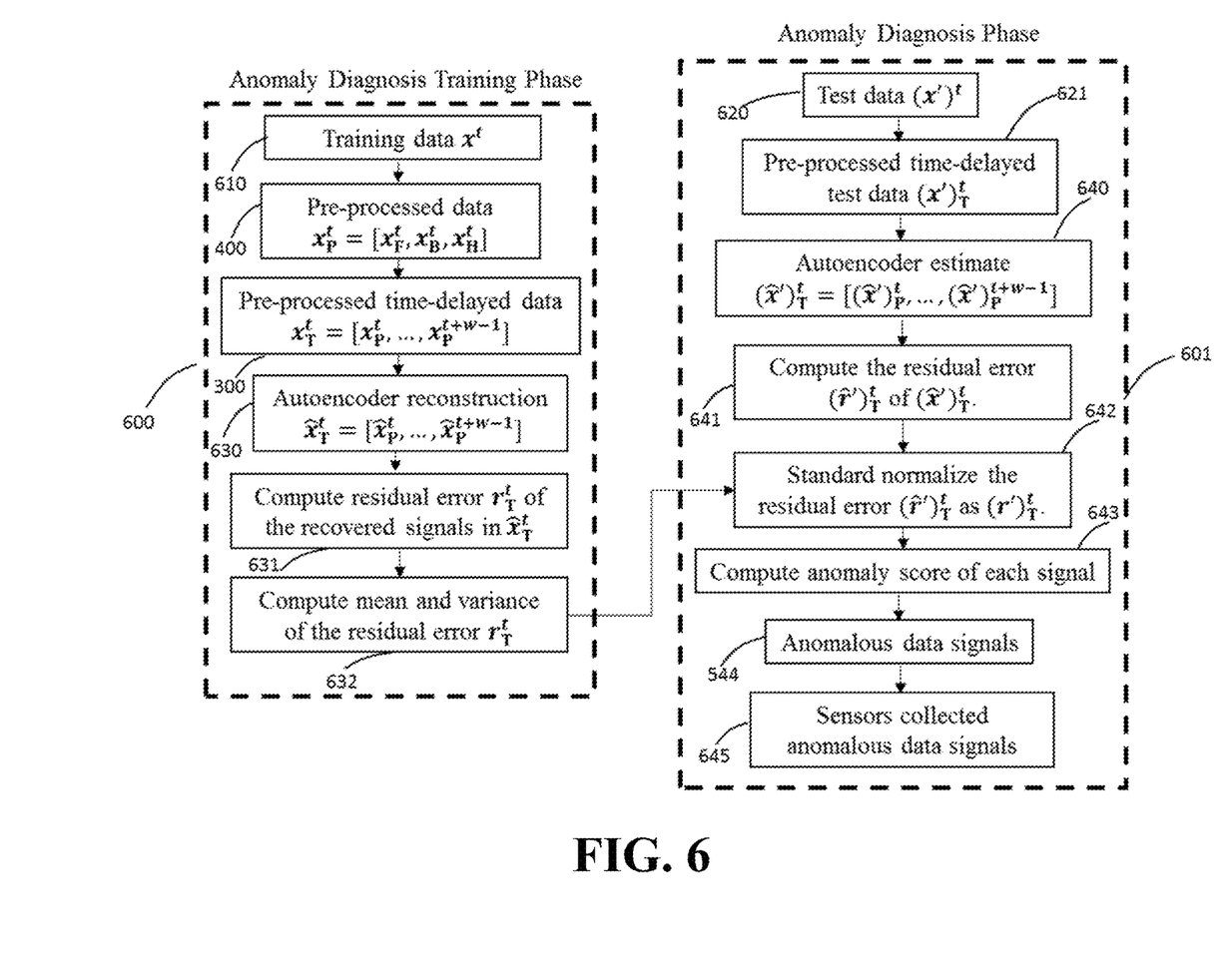
FIG. 6 depicts the flowchart of the residual error based anomaly diagnosis method, according to embodiments of the present invention.

Anomaly Detection Using Pre-Processed Time-Delay Autoencoder with Loss Function Adaptation Anomaly detection is very important for FA system maintenance and FA system efficiency improvement. FIG. 1 shows the flowchart of FA system anomaly detection 100 according to some embodiments of the present invention. There are two phases for anomaly detection, the anomaly detection training phase 101 and the anomaly detection phase 102. Assume that an optimization algorithm such as momentum algorithm is performed to train anomaly detection algorithm such as neural network. Then, during the anomaly detection training phase 101, data is collected 111 from the FA system 001 that works normally. The normal data is used as the input data to train 112 the anomaly detection algorithm. Once the anomaly detection algorithm is well-trained, the model is saved 113. For instance, if an autoencoder neural network is employed as learning model, the multiplicative weights, biases and hyper-parameters are saved 114. During the anomaly detection phase, the testing data is collected 115 from the FA system 002 that may work abnormally. The collected data are used as the input data to the well-trained anomaly detection model 116. The anomaly detection algorithm computes overall anomaly score for the testing data 117. The testing data's corresponding anomaly score is computed to identify if an anomaly is encountered. The anomaly score is determined according to the specific anomaly detection algorithm such as autoencoder neural network. If an anomaly is detected, its corresponding anomaly occurrence time, duration and severity 118 can also be determined for anomaly diagnosis and FA system maintenance. Once an anomaly is detected, the detected anomaly is diagnosed by applying anomaly diagnosis algorithms to identify the exact sources that have caused the anomaly. Anomaly diagnosis 500 process, which is illustrated in FIG. 5 and FIG. 6, is especially important to quickly restore system into normal condition.

Machine learning techniques such as neural networks can be employed as algorithms to detect anomaly in FA systems. Generally, unsupervised learning techniques are employed for anomaly detection in FA systems because it is impractical to enumerate and label all types of anomalies in a FA system.

Autoencoder neural network is an unsupervised learning technique. Conventional autoencoder works well for homogeneous data with simple structure. Due to data complexity and rigorous requirements of the FA system, conventional autoencoder faces challenges to detect anomaly in FA systems. Loss-function adaptation, temporal information consideration and the data pre-processing issues must be addressed.

Figure 2A:
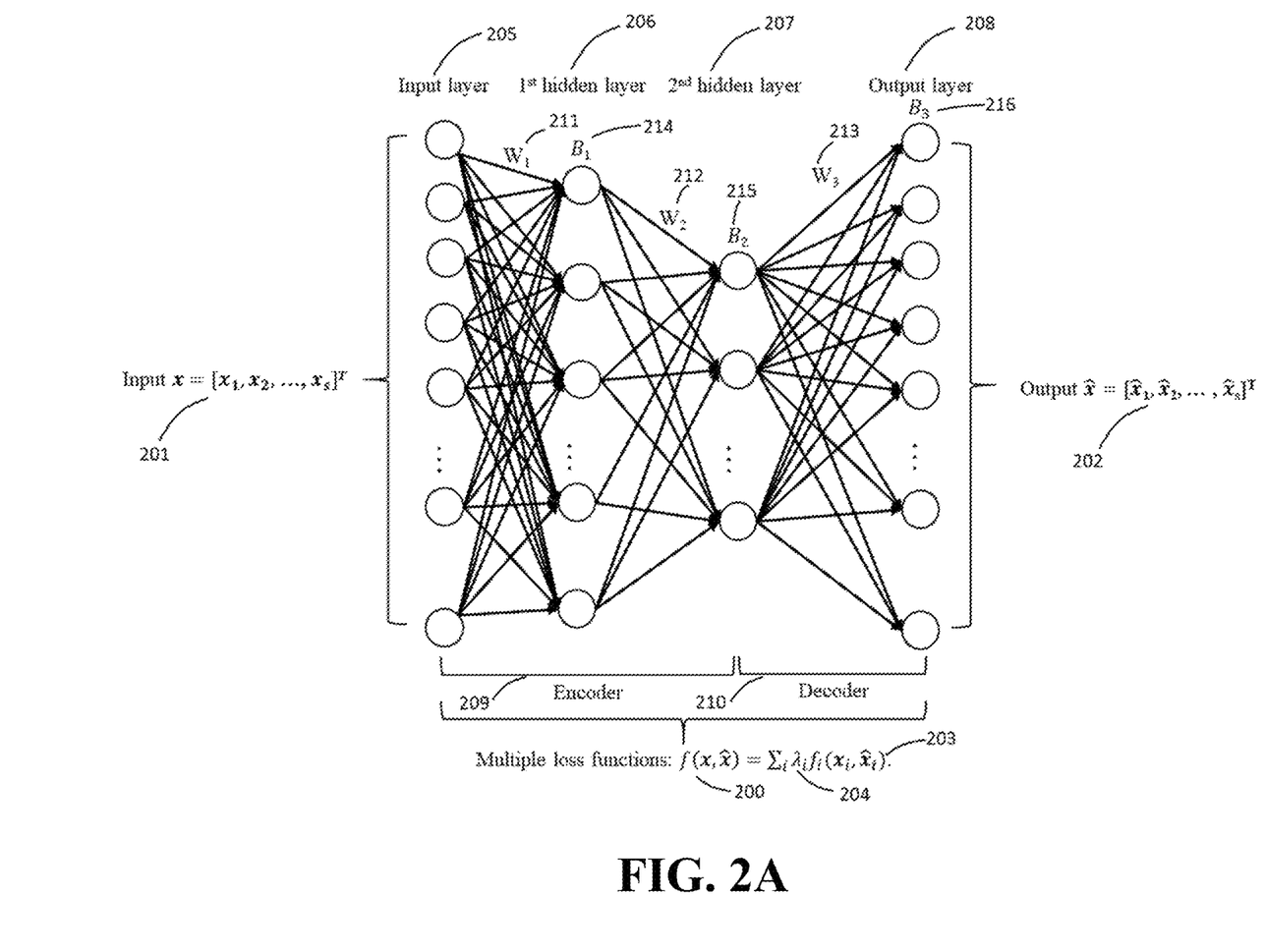
FIG. 2A depicts a multi-loss-function autoencoder neural network structure, where the loss function is comprised of multiple sub-functions adapted depending on the data type of the input data signals, according to embodiments of the present invention.

FIG. 2A depicts a multi-loss-function autoencoder neural network structure, where the loss function f(x, x̂) 200 is a function of input x 201 and output x̂ 202 and is comprised of multiple sub-loss-functions $f_i(x_i, \hat{x}_i)$ 203 depending on the type of the input data x 201, $\lambda_i$ 204 is a scaling factor corresponding to sub-loss-function $f_i(x_i, \hat{x}_i)$ 203. In the FA system, the input data x 201 contains heterogenous data types and therefore, multiple sub-loss functions are needed. FIG. 2A illustrates a four layer autoencoder including an input layer 205, an output layer 208 and two hidden layers 206 and 207. Each hidden layer and output layer comprise neurons which perform an affine combination of its inputs. Input layer 205, the first hidden layer 206 and the second hidden layer 207 make up encoder 209. The second hidden layer 207 and output layer 208 make up decoder 210. $W_1$ 211, $W_2$ 212 and $W_3$ 213 are weight metrices. $B_1$ 214, $B_2$ 215 and $B_3$ 216 are bias vectors. Weight metrics and bias vectors of the affine combination are tunable parameters that are calibrated during the training of the neural network. Weight metrics and bias vectors may also be called as model. An autoencoder constructs a recovery loss between the input layer 205 and the output layer 208. Unlike conventional autoencoder neural network that has homogeneous input data and one single loss function, input data x 201 is heterogenous, i.e., the input data x consists of different types of data based on the data characteristics. Assume input data x 201 can be decomposed to $x=[x_1, \ldots, x_s]^T$ the multi-loss-function f(x, x̂) 200 of the neural network becomes $f(x, \hat{x})=\Sigma_{i=1}^{s}\lambda_i f_i(x_i, \hat{x}_i)$, where $\lambda_i$ 204 is a scaling factor of each type of data to balance the loss gradient of each function. Each loss function is adaptively selected based on data features. Accordingly, the output $\hat{x}$ 202=$[\hat{x}_1, \ldots, \hat{x}_s]^T$ is the reconstruction of the input x 201 at the output layer.

It is important to notice that even FIG. 2A shows a four layer asymmetric autoencoder neural network structure, all embodiments of the present invention work for various layers of both asymmetric and symmetric autoencoder neural networks as well.

Figure 2B:
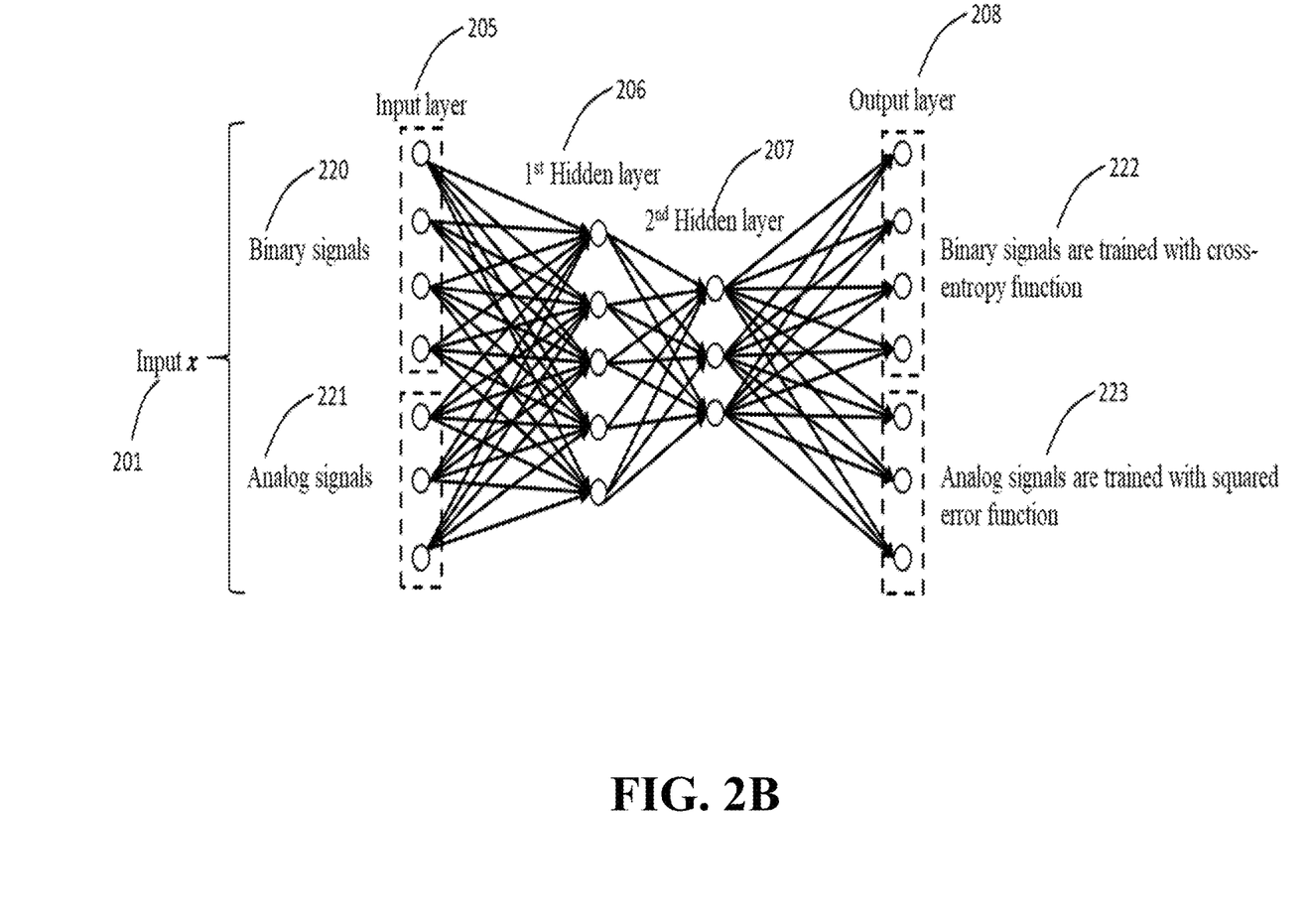
FIG. 2B shows an example of multi-loss-function adaptation for the autoencoder, where cross-entropy function is selected for binary data and squared error function is selected for analog data, according to embodiments of the present invention.

FIG. 2B shows an example of loss function adaptation using binary data 220 and analog data 221 because binary data and analog data are two popular data types in FA systems. In order to leverage the prior information about the data types, the binary cross-entropy loss function 222 is applied to the binary data signals 220 and the squared error loss function 223 is applied to the analog data signals 221. The final loss function is the combination of the two loss functions 222 and 223. By employing more suitable loss functions, the output layer can learn the input data signals more accurately after the encoding and decoding processes of the autoencoder.

Figure 3:
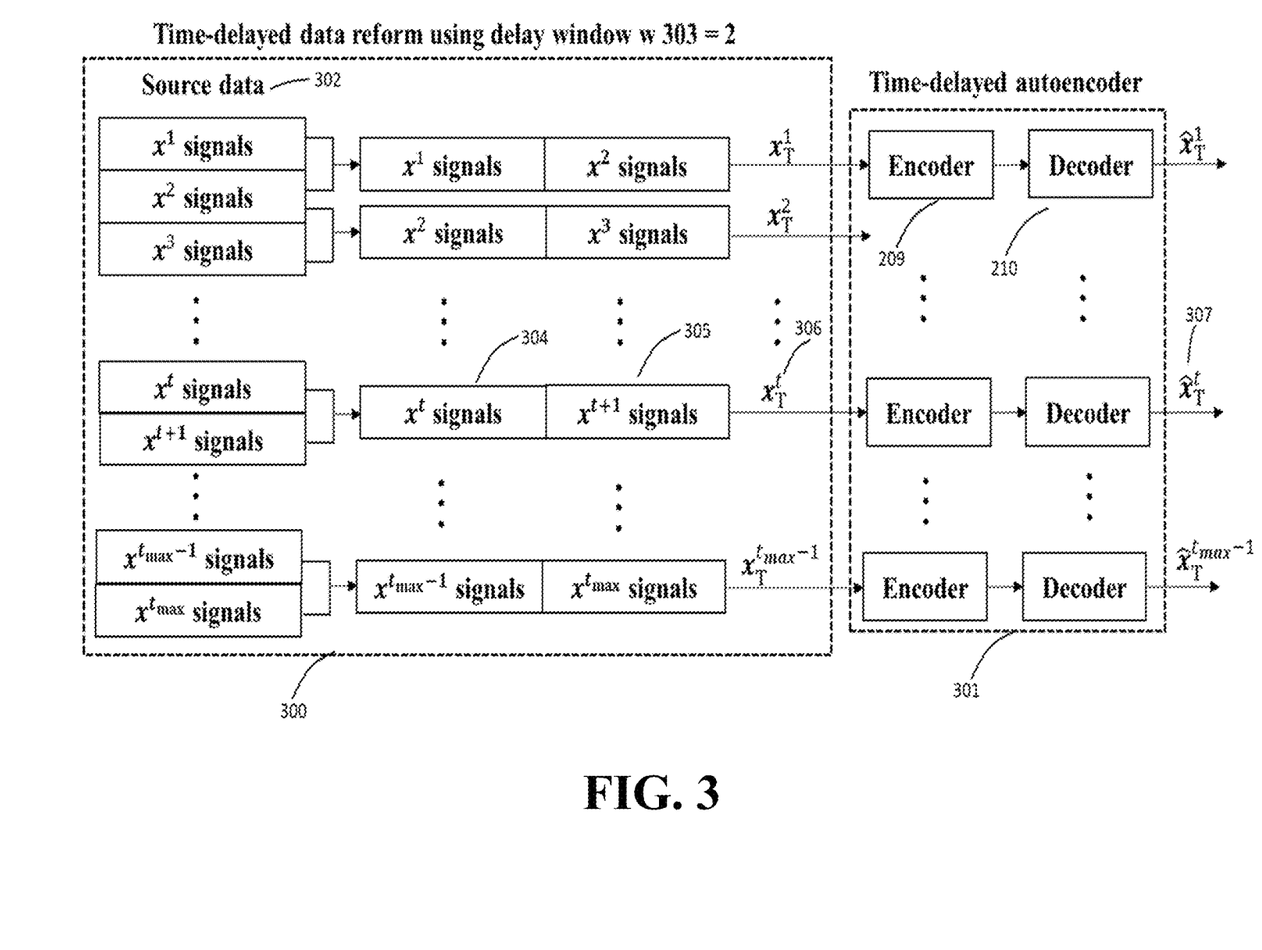
FIG. 3 shows the flowchart of time-delayed data reform, where the source data is reformed by a time-delay window of size 2, according to embodiments of the present invention.

Combining historic data can provide important information for FA system anomaly detection, e.g., some anomaly may be caused by a series of miss-operations. Therefore, taking into account of temporal factor can detect anomaly that is caused by a series of miss-operations. For this purpose, the embodiments of the invention provide the time-delayed data reform process 300 that is illustrated in FIG. 3. The autoencoder neural network that takes the time-delay reformed data as input is called time-delay autoencoder (TDAE) 301, which can be applied for anomaly detection in FA systems. As a result, a TDAE is an autoencoder for which source data (input data) 302 are reformed based on a time-delay window w 303 that specifies length of history to be taken into account. Suppose the source data 302 is collected successively in time. Let $x^t$ denote the source data at the $t_{th}$ time index. The time-delayed data reform $x_T^t$ 306 is defined as:

$$x_T^t = [x_T^t, \ldots, x_T^{t+w-1}] \quad (1)$$

Time-delayed data reform impacts input data on spatial domain and time domain. The spatial dimension of the reformed data, i.e., number of input signals, is increased by w times and the number of samples of each signal is reduced by w−1. As number of input signals increases, TDAE 301 has a network structure that is much larger and more complex than conventional autoencoder. For example, if w=2 and 10 data signals have been collected, the time-delayed data reform produces 10*w=20 signals. On the other hand, time-delayed data reform reduces number of data samples in time domain. For example, if w=2 and source data signal contains 1000 samples, time-delayed data reform reduces number of samples to 1000−(w−1)=999.

FIG. 3 illustrates an example of time-delayed data reform using a time-delay window w=2. It can be seen that the input data to TDAE 301 becomes a concatenation sequence of the source data 302. For example, the reformed input data $x_T^t$ 306 is a concatenation sequence of the source data $x^t$ 304 and $x^{t+1}$ 305, where $x^t$ is the source data at the $t_{th}$ time index and $x^{t+1}$ is the source data at the $t+1_{th}$ time index. For the reformed input data $x_T^t$ 306, the TDAE 301 outputs the corresponding reconstruction $\hat{x}_T^t$ 307.

The TDAE is one of the autoencoder structures to leverage neural networks for temporal information learning. It learns the temporal relationships between the data signals over time, where the temporal relationship of data signals can reveal critical information in FA systems. Since the temporal information is explored by the TDAE, an improved anomaly detection performance can be obtained.

Furthermore, to detect anomaly in FA systems using autoencoder neural networks, the quality of the input data is critical as the neural network intentionally learns the input data characteristics. Noise data or uncleaned data may lead to false detection or missing detection. Some embodiments of the invention provide the methods to pre-process the source data before feeding data into an autoencoder neural network. In order to magnify the difference in signals between normal data and abnormal data and improve the accuracy of anomaly detection, the data signals are pre-processed by applying digital filters. The digital filters are chosen to filter the undesired features of the data signals. For example, data signals can be filtered in a preset frequency band. As a result, the magnitude of each data signal's constituent frequencies that are out of the designed frequency bands are diminished. There are different types of digital filters, the Chebyshev filters are used as an example to illustrate the filtering procedure as illustrated in FIG. 4.

There can be numerous data types in FA systems. Even embodiments of the present invention work for multiple data types, two types of data, i.e., analog data and binary data, are used to illustrate data pre-processing because binary data and analog data are two popular data types in FA systems. Let $\{x_i\}_{i=1}^N$ be the set of source data signals. For the $i_{th}$ data signal $x_i$, let $x_i^t$ denote sample of the data signal at the $t_{th}$ time index. FIG. 4 shows the flowchart of the data pre-processing 400, where source data 401 consists of analog data and binary data. It is important to notice that the value of some data signals such as binary signals has fixed range, but the value of other data signals such as analog signals has non-fixed range. Therefore, the first step of data pre-processing is data normalization 402, which transfers values of source data signals into fixed ranges such as in interval [0, 1]. The normalized data signals are then divided into different types and further pre-processed. The binary signals 403 are preserved, i.e., applying unit impulse filter 408. However, analog signals 404 are processed by applying Chebyshev filters 405. More specifically, the analog signals 404 are pre-processed by a band-pass filter 406 and a high-pass filter 407. The Chebyshev filters are able to modify the signal's frequency domain characteristics. The pre-processed data 409 consists of binary signals, output of the Chebyshev band-pass filter and output of the Chebyshev high-pass filter. Denote $x_F^t$ as the binary signals at time index t, $x_B^t$ as the Chebyshev band-pass filter's output of the analog signals and $x_H^t$ as the Chebyshev high-pass filter's output of the analog signals, respectively. The pre-processed data 409 refers to the concatenation sequence $$x_P^t = [x_F^t, x_B^t, x_H^t], t = 1, 2, \ldots, t_{max} \quad (2)$$

Figure 4:
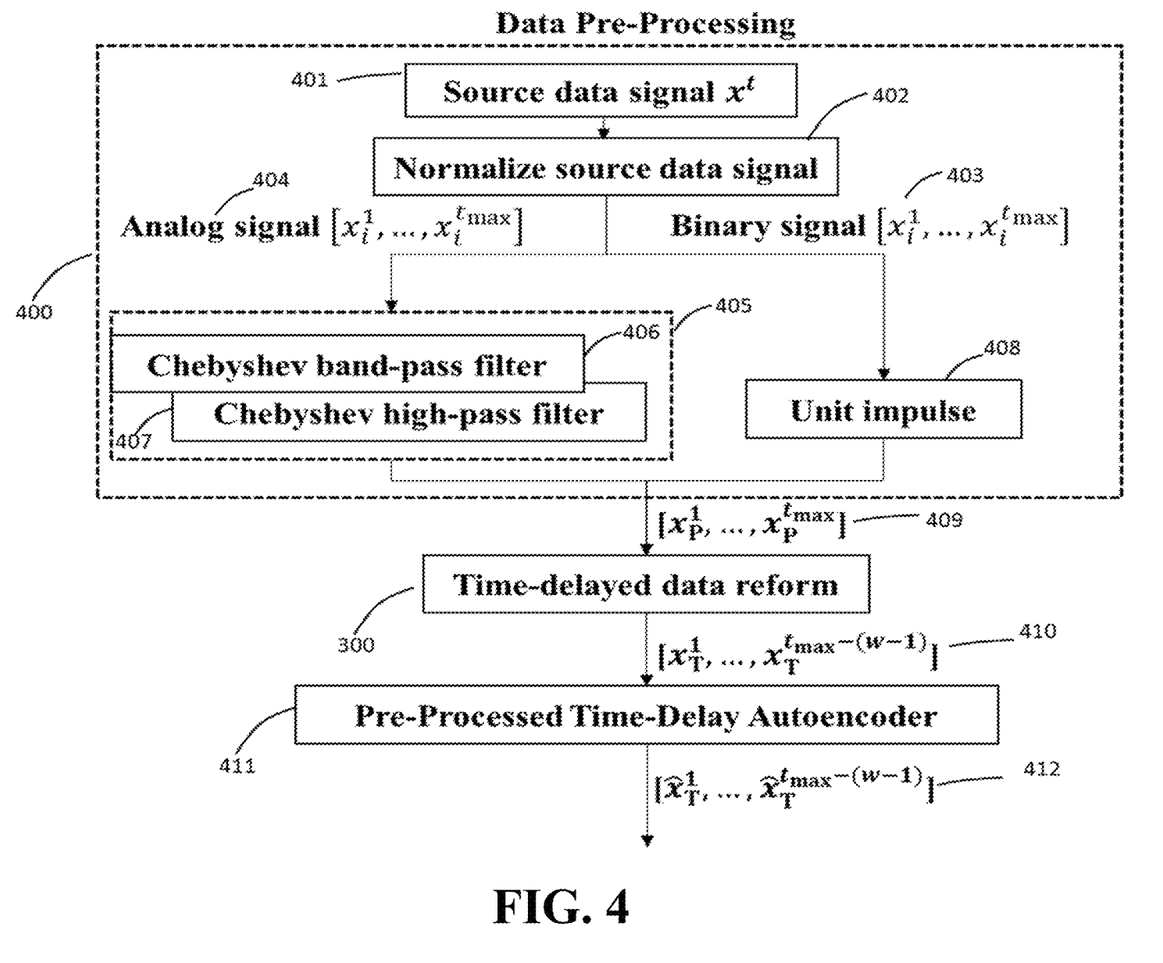
FIG. 4 shows the flowchart of the data pre-processing, where input data are divided into analog data and binary data, according to embodiments of the present invention.

The pre-processed data 409 can be directly feed to autoencoder neural network or go through time-delayed reform as shown in FIG. 4. If the pre-processed data 409 are directly feed to the autoencoder, the resulted autoencoder is called as pre-processed autoencoder (Prep-AE). However, as mentioned above, temporal information is important in FA systems. Therefore, in FIG. 4, the pre-processed data 409 take time-delayed reform 300, which outputs pre-processed time delay data 410. The autoencoder neural network that takes the pre-processed time-delayed data as input data is called pre-processed time-delay autoencoder (Prep-TDAE) 411. The Prep-TDAE outputs result 412 as $$\hat{x}_P^t = [\hat{x}_F^t, \hat{x}_B^t, \hat{x}_H^t], t = 1, 2, \ldots, t_{max} - (w-1) \quad (3)$$

During anomaly detection phase, training data and test data are first pre-processed and then take time-delayed reform. The pre-processed time-delayed training data are used to train Prep-TDAE. The pre-processed time-delayed test data are inputted to trained Prep-TDAE for anomaly detection. If the test error exceeds a pre-defined threshold, an anomaly is detected. The anomaly occurrence time, anomaly duration and anomaly severity can also be determined. Anomaly occurrence time corresponds to time index of test data, at which test error exceeds the threshold. For example, if the $1^{st}$ time index corresponds to 1 pm and data are sampled every 100 millisecond. The $10^{th}$ time index indicates time 1 second after 1 pm. Anomaly duration indicates the length of the time anomaly presents. For example, if data samples are collected every 10 millisecond and anomaly lasts for 5 consecutive time index, anomaly duration is 50 milliseconds. The anomaly severity can be determined based magnitude of the test error. The greater the magnitude of test error is, the severer the anomaly is.

Notice that the anomaly index detected by Prep-TDAE is the TDAE input index. The corresponding time index can be computed as Time Index=TDAE Input Index+Time-Delayed Window Size.

Anomaly Diagnosis in FA System and Manufacturing Production Line

Anomaly diagnosis is to identify the exact sources that have caused an anomaly. A FA system consists of various hardware and software components. Some anomalies may be caused by a single component and other anomalies may be caused by a combination of multiple components. Some embodiments of the invention provide the statistical-based and residual error-based anomaly diagnosis methods.

Anomaly Diagnosis Using Statistical Based Method

FIG. 5 depicts the flowchart of the statistical-based anomaly diagnosis method based on the pre-processed time-delayed data structure. As shown in FIG. 5, there are two phases of diagnosis, diagnosis training 500 and diagnosis 501. During the diagnosis training, Training data $x^r$ 510 first go through pre-process 400 and then go through time-delay reform 300. The pre-processed time-delayed data are standard normalized 511 to $\tilde{x}_T^t$, which has zero mean and unit variance of each signal. To avoid the covariance matrix of the normalized signals to be noninvertible, a shrunk covariance matrix is computed 512 based on the covariance matrix of $\tilde{x}_T^r$. Let $\Sigma_{shrunk}$ be the shrunk covariance matrix, its corresponding whitening matrix $\Lambda$ can be computed 513. For instance, the Mahalanobis whitening matrix can be computed by $\Lambda = \Sigma_{shrunk}^{-1/2}$. Then, the whitening matrix $\Lambda$ is saved and employed to whitening transform 514 the signals $\tilde{x}_T^t$, where the whitening transform indicates the process of $\Lambda \tilde{x}_T^t$. The resulting sequences' mean and variance of each signals are computed 515 and saved to be used during the anomaly diagnosis phase 501.

In the anomaly diagnosis phase 501, similar to the diagnosis training, the test data 520 are pre-processed and time-delayed reformed. The pre-processed time-delayed test data 521 is firstly standard normalized 511. Then, the stored whitening matrix is used to whitening transform 522 the normalized testing data. After that, the stored mean and variance in the last step of anomaly training are used to standard normalize 523 the resulting sequence after whitening transform.

Let $\acute{x}_T^t = [\acute{x}_P^t, \ldots, \acute{x}_P^{t+w-1}]$ be the final standard normalized testing sequence after whitening transform and $p^t$ be the anomaly score in a pre-processed form, where $p^t = [p_F^t, p_B^t, p_H^t]$. The anomaly score is computed 524 in the following steps:

1. $p^t = \Sigma_{m=t}^{t+w-1} (\acute{x}_P^m)^2$, where $(\acute{x}_P^m)^2$ is the pre-processed form of the anomaly score at the $m_{th}$ time index.
2. The anomaly score $a_A^t$ of the analog sensors are computed by $a_A^t = [p_B^t + p_H^t]$.
3. The final anomaly score of sensors is return as $a^t = [p_F^t, a_A^t]$.

It can be observed that the anomaly score of the analog sensors are computed by adding the anomaly score of the pre-processing filters' output. This indicates that any anomalous signal is detected among the pre-processing filter's output, the corresponding sensor will be identified as an anomaly.

It can also be seen that the final anomaly score is computed for each data signal. For a data signal, if its anomaly score exceeds a pre-defined threshold, the data signal is identified as an anomalous signal 525. For each anomalous signal, the sensors that collected the signal are identified 526. The anomalous sensors correspond to FA system components that work abnormally.

Anomaly Diagnosis Using Residual Error Based Method

FIG. 6 illustrates a residual error-based anomaly diagnosis method. The residual error corresponds to the estimation error of the pre-processed time-delayed autoencoder neural network structure (Prep-TDAE). Define $r_T^t$ as residual error of the Prep-TDAE. $r_T^t$ has a pre-processed time-delayed form.

For the binary signal $x_{T,i}^t$, the residual error is computed as $$r_{T,i}^t = -x_{T,i}^t \log\left(\frac{1}{1+\exp(-\hat{x}_{T,i}^t)}\right)(1-x_{T,i}^t)\log\left(\frac{1}{1+\exp(-\hat{x}_{T,i}^t)}\right). \quad (4)$$

For the analog signal $x_{T,j}^t$, the residual error is computed as $$r_{T,j}^t = \tfrac{1}{2}(x_{T,j}^t - \hat{x}_{T,j}^t)^2 \quad (5).$$

During the diagnosis training, Training data x'610 first go through pre-process 400 and then go through time-delay reform 300. The pre-processed time-delayed data $x_T^t$ are inputted to Prep-TDAE, which then outputs estimate of $x_T^t$ as $\hat{x}_T^t$ 630. The residual error $r_T^t$ of the recovered signals $\hat{x}_x^t$ is computed 631 using equations (4) and (5). The mean and variance of the residual errors $r_T^t$ are then computed and stored 632. Correspondingly, in the anomaly diagnosis phase, test data (x')$^t$ 620 go through pre-processed time-delay reform 621. The pre-processed time-delayed test data $(x')_T^t$ are inputted to Prep-TDAE, which outputs estimate $(\hat{x}')_T^t$ 640. The residual error $(\hat{r}')_T^t$ of the testing sequence $(\hat{x}')_T^t$ is then computed 641. Next, the residual error $(\hat{r}')_T^t$ is standard normalized 642 based on the stored mean and variance of each signal during the anomaly diagnosis training phase. Given the normalized residual errors $\hat{r}_T^t = [\hat{r}_P^t, \ldots, \hat{r}_P^{t+w-1}]$, the anomaly score is computed 643 following the steps below:
1. $p^t = \Sigma_{m=t}^{t+w-1} \text{abs}(\hat{r}_P^m)$, where abs($r_P^m$) is the pre-processed form of the anomaly score at the $m_t$h time index.
2. The anomaly score $a_A^t$ of the analog sensors are computed by $a_A^t = [p_B^t + p_H^t]$.
3. The final anomaly score of sensors is return as $a^t = [p_F^t, a_A^t]$.

It can be observed that if the Prep-TDAE residual errors are independent, when an anomaly occurs, a large reconstruction error of the corresponding sensors will be induced. A threshold can be preset to determine the anomalous sensors. For a data signal, if its anomaly score exceeds a pre-defined threshold, the data signal is identified as an anomalous signal 644. For each anomalous signal, the sensors that collected the signal are identified 645. The anomalous sensors correspond to FA system components that work abnormally.

Figure 7:
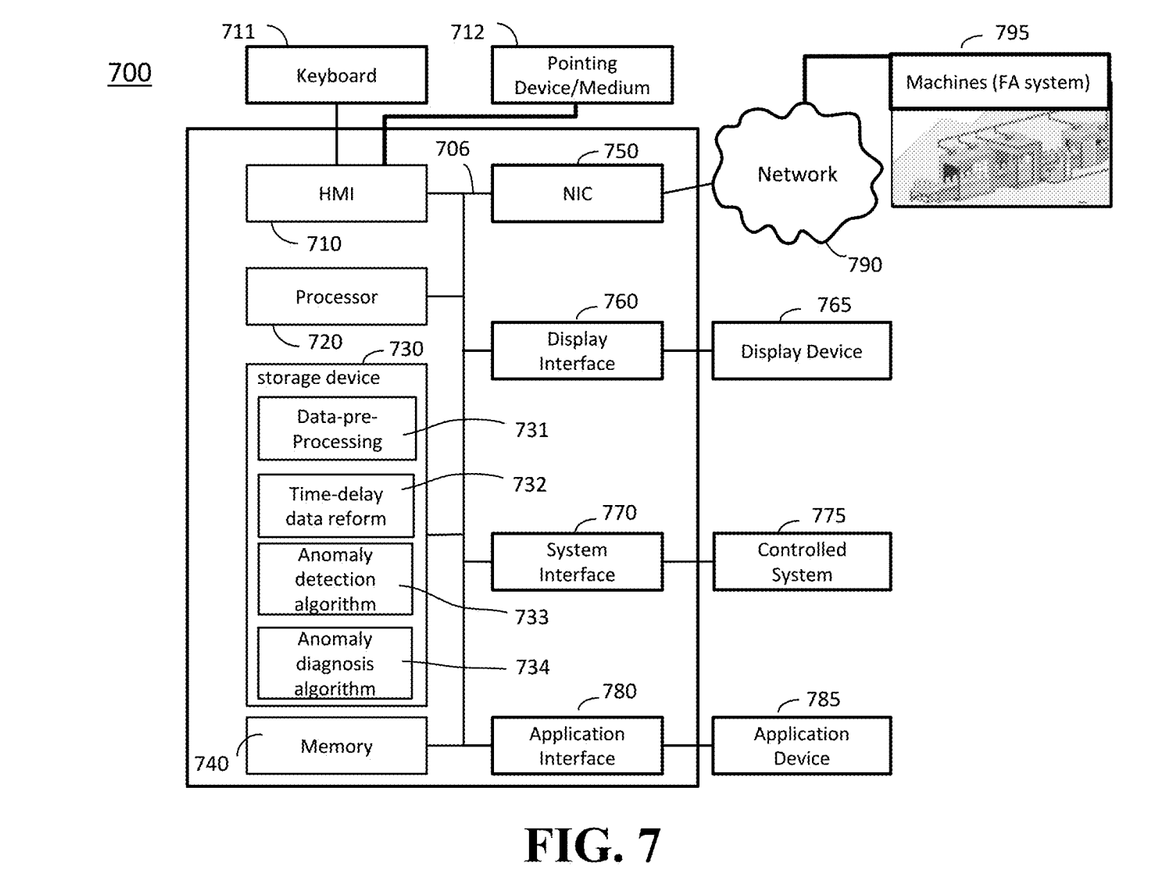
FIG. 7 shows a block diagram of anomaly detecting system, according to embodiments of the present invention.

FIG. 7 shows a block diagram of anomaly detecting system, according to embodiments of the present invention. The figure shows a block diagram of apparatus 700 for controlling a system including a plurality of sources of signals causing a plurality of events in accordance with some embodiments. An example of the system is a manufacturing production line. The apparatus 700 includes a processor 720 configured to execute stored instructions, as well as a memory 740 that stores instructions that are executable by the processor. The processor 720 can be a single core processor, a multi-core processor, a computing cluster, or any number of other configurations. The memory 740 can include random access memory (RAM), read only memory (ROM), flash memory, or any other suitable memory systems. The processor 720 is connected through a bus 706 to one or more input and output devices.

These instructions implement a method for detecting and/or diagnosing anomaly in the plurality of events of the system. The apparatus 700 is configured to detect and diagnose anomalies using stored program 730. The stored program includes the data-pre-processing function 731, time-delay data reform function 732, anomaly detection algorithm 733 and anomaly diagnosis algorithm 734. The anomaly detection algorithm 733 can be the Prep-TDAE and the anomaly diagnosis algorithm 734 can be statistical-based method or residual error-based method. The anomaly detection algorithm 733 and anomaly diagnosis algorithm 734 are trained to detect and diagnose a control state of the system. For example, the Prep-TDAE neural network 733 can be trained offline by using the operating data and used to detect anomaly online. Similarly, the anomaly diagnosis algorithm can be trained offline and used to diagnose anomaly online. Examples of the operating data include signals from the source of signals collected during the operation of the system, e.g., events of the system. Examples of the training data include the signals from the source of signals collected over a period of time. That period of time can be before the operation/production begins and/or a time interval during the operation of the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A computer-implemented pre-processed time-delay autoencoder based anomaly detection method for detecting anomalous states of machines arranged in a factory automation (FA) system or a manufacturing production line, comprising steps of:
   acquiring source signals from the machines via an interface;
   performing a data pre-processing process for the acquired source signals by normalizing value ranges of the acquired source signals and filtering undesired features from the acquired source signals;
   performing a time-delayed data reform process for the pre-processed source signals based on a time-delay window to generate pre-processed time-delay data;
   submitting pre-processed time-delay testing data to a pre-processed time-delayed autoencoder (Prep-TDAE) neural network, wherein the pre-processed time-delay testing data are collected online while the machines are operated, wherein the Prep-TDAE neural network has been pre-trained by using a pre-processed time-delay training data;
   detecting, if an anomaly state is encountered with respect to the machines, by computing anomaly scores of the pre-processed time-delay testing data; and
   determining, when the anomaly state is detected, anomaly occurrence time, duration and severity with respect to the anomaly state of each of the machines.

2. The method of claim 1, wherein the data pre-processing process divides the normalized source signals into normalized analog signals and normalized binary signals.

3. The method of claim 1, wherein in the determining step, the anomaly state is detected by computing the anomaly score of the normalized signals.

4. The method of claim 1, wherein an input layer of the Prep-TDAE neural network is configured to accept a binary part of the pre-processed time-delay data via a binary acceptor of the input layer and accept an analog part of the pre-processed time-delay data via an analog acceptor of the input layer.

5. The method of claim 1, wherein in the step of pre-processing, the acquired signals are divided into binary signals and analog signals, wherein the analog signals are processed by a band-pass filter followed by a high-pass filter, wherein the binary signals are processed by a unit impulse filter.

6. The method of claim 1, wherein the Prep-TDAE neural network performs loss function adaptation by applying different loss functions to different data types.

7. The method of claim 6, wherein binary signals are trained with a cross-entropy loss function and analog signals are trained with a squared error loss function.

8. The method of claim 1, wherein the anomaly occurrence time corresponds to a time index of test data, at which the anomaly score exceeds a predefined threshold.

9. The method of claim 1, wherein the anomaly duration is the length of the time during which the anomaly score of test data persistently exceeds a predefined threshold for consecutive time indices.

10. The method of claim 1, wherein the anomaly severity is determined based on a magnitude of the anomaly score.

11. A pre-processed time-delay autoencoder based anomaly detection system for detecting anomalous states of machines arranged in a factory automation (FA) system or a manufacturing production line, comprising steps of:
   an interface configured to acquire source signals from the machines;
   a memory to store computer-executable programs including a data pre-processing algorithm, a time-delayed data reform process algorithm, a pre-processed time-delay autoencoder (Pre-TDAE) neural network, and an anomaly diagnosis algorithm; and
   a processor configured to perform steps of:
   performing a data pre-processing process algorithm for the acquired source signals by normalizing value ranges of the acquired source signals and filtering undesired features from the acquired source signals;
   performing the time-delayed data reform process algorithm for the pre-processed source signals based on a time-delay window to generate pre-processed time-delay data;
   submitting pre-processed time-delay testing data to a Prep-TDAE neural network, wherein the pre-processed time-delay testing data are collected online while the machines are operated, wherein the Prep-TDAE neural network has been pre-trained by using pre-processed time-delay training data;
   detecting, if an anomaly state is encountered with respect to the machines, by computing anomaly scores of the pre-processed time-delay testing data; and
   determining, when the anomaly state is detected, anomaly occurrence time, duration and severity with respect to the anomaly state of each of the machines.

12. The system of claim 11, wherein the data pre-processing process divides the normalized source signals into normalized analog signals and normalized binary signals.

* * * * *